Oct. 28, 1958    A. G. H. VANDERPOEL ET AL    2,857,897
ENGINE MANIFOLD SCAVENGING CONTROL
Filed Nov. 5, 1956          2 Sheets-Sheet 1
Fig. 1.
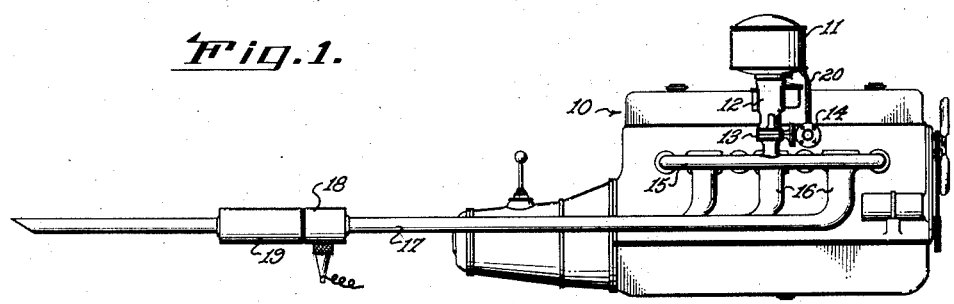
Fig. 7.     Fig. 2.
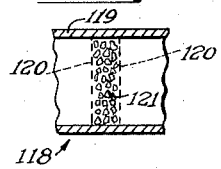
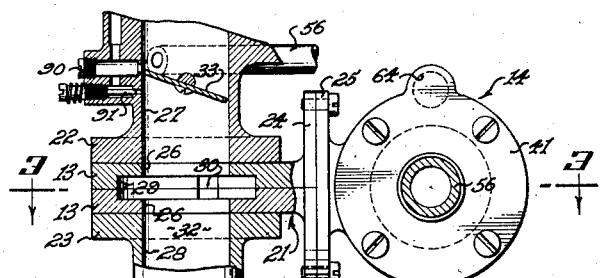
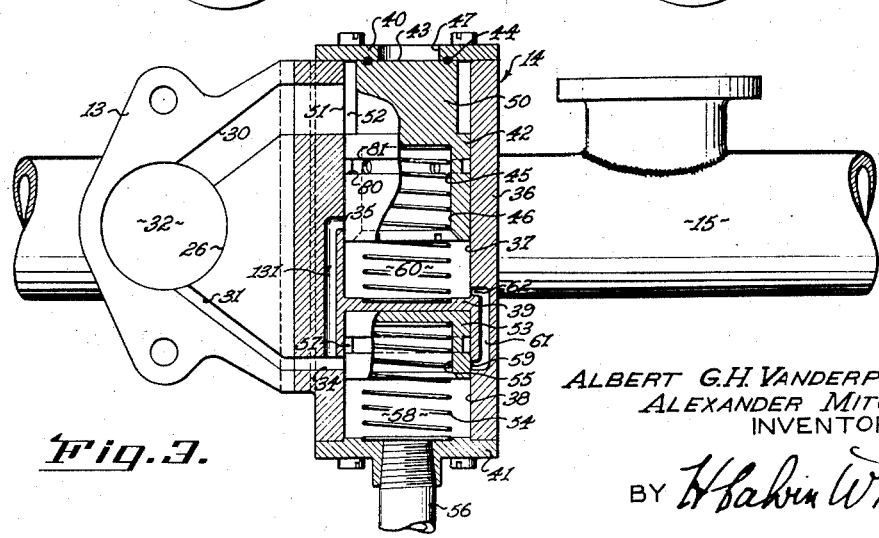
Fig. 3.
ALBERT G. H. VANDERPOEL
ALEXANDER MITCHELL
INVENTORS
BY *H. Baldwin White*
ATTORNEY

ALBERT G. H. VANDERPOEL
ALEXANDER MITCHELL
INVENTORS

BY *H Calvin White*
ATTORNEY

2,857,897

ENGINE MANIFOLD SCAVENGING CONTROL

Albert G. H. Vanderpoel, Gardena, and Alexander Mitchell, Los Angeles, Calif.

Application November 5, 1956, Serial No. 620,337

20 Claims. (Cl. 123—97)

This invention relates generally to apparatus for air scavenging of internal combustion engine intake manifolds to rapidly lower suction conditions therein primarily during engine deceleration and also to sweep unvaporized fuel collected in the manifold into the engine cylinders for combustion therein during engine deceleration, thereby preventing partial or incomplete combustion of collected unvaporized fuel for discharge from the engine as objectional fumes during engine acceleration after deceleration. More particularly, the invention is directed to an improved scavenging air control device operative to pass scavenging air to the engine manifold during deceleration to reduce manifold suction to values below and upper limit equivalent to manifold suction during engine idling conditions, regardless of engine speed, resulting in reduced noxious or objectionable fume discharge from the engine.

In the past, it has been generally believed that noxious fume generation on engine deceleration was due to drawing fuel from the carburetor idle jets into the intake manifold and the engine by high manifold suction; however, manometer tests show that flow of fuel from these jets at high engine speed during deceleration is not appreciably greater than fuel delivery therefrom at idle speed, demonstrating that the provision of idle fuel cut-off devices is not the answer to the problem of noxious fume causation. On the contrary, the primary sources of these fumes are accumulations of heavier fuels, lubricants and liquids in the intake manifold and combustion chamber pockets, especially in engines that have been in service for some time.

While devices have been developed to eliminate these decelerating fumes, such as idle cut-off mechanisms mentioned above and scavenger air admitting systems, they have not been entirely successful. For example, some scavenger air systems flood the intake manifold with air to drop the vacuum therein to zero on deceleration, but causing undesirable chilling and drying thereof leading to "flat spot" occurrence on acceleration. These and other scavenger air systems are operated in response to manifold vacuum conditions, or by solenoids, water pressure application, etc., requiring undesirable installation expense and adjustment.

Speaking with reference to previously built manifold suction operated scavenging air control devices, they have in general been so constructed that scavenging air is admitted to the manifold whenever manifold suction communicated to the device exceeds a minimum suction value approximately equal to suction at engine idling conditions, i. e., around eighteen or nineteen inches of mercury at sea level, scavenging air flow being cut-off below this value. Thus, whenever during engine cruising the operator permitted the carburetor throttle to close in order to decelerate the engine, manifold suction would build up rapidly to a representative value of around twenty-five inches of mercury, so that the scavenging air control device would operate to pass air into the manifold reducing the suction therein until the latter dropped to around eighteen inches of mercury, and then the device would cease to pass scavenging air to the manifold. However, at high engine speeds during deceleration, the device would tend to oscillate since stoppage of scavenging results in buildup of manifold suction to a value causing the device to operate again to admit scavenging air, particularly during deceleration from high engine speed.

It was not considered practical to admit scavenging air to the manifold when manifold suction communicated to the control was less than idling suction, since such less suction exists during partial opening of the throttle corresponding to engine acceleration or cruising conditions, and scavenging of the manifold at such times would dilute the otherwise combustible air-fuel mixture to incombustibility. Therefore, prior devices failed to scavenge all of the heavier unvaporized liquids accumulated in the manifold and combustion chambers. Also, failure to scavenge at manifold vacuum conditions less than idle suction or vacuum resulted in considerable suction of lubricating oil from around the pistons into the engine cyilnders to be later discharged from the engine in the form of objectionable fumes. Finally, initiation of scavenging in response to manifold vacuum conditions resulted in non-operation of the scavenging control at altitudes higher than that at which the device was adjusted, due to decreased manifold vacuum.

It is a major object of the present invention to provide an improved engine manifold air scavenging control device having a novel construction and operating in such a way as to do away with the objectionable characteristics of prior scavenge control devices mentioned above, as will be seen, especially the previously required mechanical connections and other auxiliary fittings that prevented former devices from having universal application to all makes of internal combustion engines. Basically, the improved device comprises main valve means to control flow of scavenging air to the manifold and which is movable to pass the flow upon application to the main valve of manifold suction in excess of a predetermined value that is equal to and preferably considerably less than manifold suction at engine idling conditions, together with other valve means in communication with the main valve and movable to control application of said manifold suction to the main valve upon predetermined suction communication to the other valve during engine deceleration. The main valve is operable to pass scavenging air to the manifold only during engine deceleration, in spite of the fact that the main valve is movable to pass scavenging air flow upon application thereto of manifold suction less than idling suction, such less than idling suction existing in the manifold during acceleration for example. This means that scavenging air is passed to the manifold during engine deceleration until suction therein is reduced to the point where remaining unvaporized heavier liquids and fuel particles in the manifold and combustion chambers are minimized, and suction of lubricating oil into the cylinders of the engine may be practically eliminated.

The device admits only enough atmospheric air to the manifold on deceleration to maintain manifold vacuum or suction at a value or values the maximum of which is equivalent to manifold suction at idle conditions regardless of engine speed, so that as the engine speed drops manifold suction will also decrease, ultimately to that predetermined value well below eighteen inches of mercury at which scavenging air flow is interrupted, at which time the engine speed is sufficiently reduced to prevent oscillation of the device. This prevents generation of noxious fumes, manifold chilling and by keeping the idle jet fuel supply channels active scavenging air can be supplied until the engine speed has dropped almost to idle speed, without engine stalling.

These particular advantages and improved operation of the controller are primarily derived from the provision of such other valve means controlling application of manifold suction to the main valve only in response to communication to the other valve means during engine deceleration of suction other than directly from the manifold, said predetermined suction preferably but not necessarily being taken from a portion of the engine air intake passage just above the throttle gate therein, so as to be independent of manifold suction during idling and during deceleration, as will be brought out.

Other features and objects of the invention, as well as the details of an illustrative embodiment, will be more fully understood from the following detailed description of the drawings, in which:

Fig. 1 is an elevation showing a typical complete air intake and burned-gas exhausting system for an engine;

Fig. 2 is an enlarged elevation showing the improved air scavenging control device connected into the engine air intake system;

Fig. 3 is a plan view partly in section taken on line 3—3 of Fig. 2;

Fig. 7 is a section through a catalytic afterburner.

Figure 4:
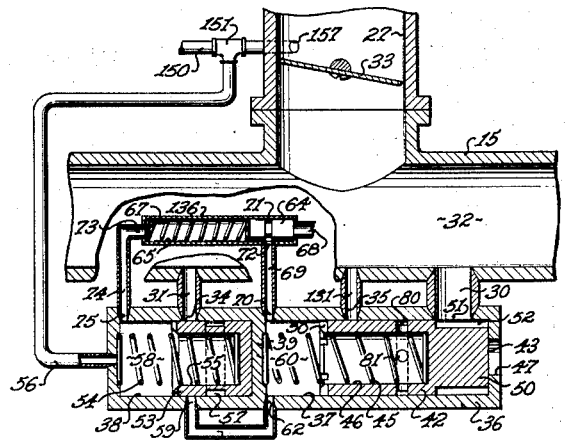
Fig. 4 is a schematic showing of the control device elements during engine idling conditions.

In Fig. 1, air is supplied to the engine 10 through a filter 11, carburetor 12, connecting flanges 13 of the control device 14, and the intake manifold 15; and burned gases from the engine are discharged through manifold 16 to the exhaust line 17 discharging through a combined exhaust neutralizer 18 and muffler 19, the former typically comprising an afterburner or being of the catalytic type, containing reagents such as activated charcoal, the neutralizing action being typically one of oxidation of the heavy scavenged liquids or by combustion. A spark plug on the afterburner is operable to ignite any combustible engine hydrocarbons exhausted through the afterburner. Fig. 7 shows a catalytic afterburner 118 having a tubular shell 119 across the bore of which a pair of screens 120 extend. A suitable catalyst 121 retained between the screens is operable to effect neutralization or burning of any engine hydrocarbons exhausted therethrough. The controller is shown in Fig. 1 as receiving scavenging air from the filter 11 through a line 20, which is not shown in other figures of the drawings.

For connecting the standard size controller 14 in scavenging air passing communication with different size engine intake manifold systems, adapter 21, including the flanges 13 are provided, the flanges 13 being variously sized for reception in superposed relation between the carburetor and intake manifold flanges 22 and 23 respectively, various sized adapters including a standard side flange 24 for connection to the controller flange 25, as seen in Fig. 2. In order that the carburetor and air filter not be raised to any appreciable degree causing interference with the engine hood, the two flanges 13 are preferably made in the form of relatively thin cast plates containing bores 26 in registration with the carburetor and intake manifold bores 27 and 28, and the flanges also contain counterbores 29 in mutual registration. Communicating with the latter is a relatively wide but thin passage 30 formed in the flanges 13 to pass scavenging air from the controller to the air intake system of the engine, the width of the passage being such as to accommodate maximum flow of scavenging air in spite of the fact that the flanges are relatively thin.

A relatively small sized duct 31 is formed in one or both of the flanges 13 as seen in Fig. 3 to communicate between the air inlet passage 32 subject to manifold suction below the carburetor throttle 33 and the controller ports 34 and 35.

Coming now to the description of the control unit itself, as viewed in Fig. 3, it includes a cylindrical housing 36 containing coaxial bores 37 and 38 separated by a partition 39 and closed at opposite ends of the housing by caps 40 and 41. Slidably mounted in bore 37 is a valving piston 42 urged toward the cap 40, against which the end 43 of the piston seals through O-ring 44, by a compression spring 45 received in the piston bore 46 and bearing against the partition 39. When the piston end 43 is retracted away from cap 40 by suction communicated to chamber 60 at the spring side thereof, scavenging air is admitted through an opening 47 in the cap 40 into passage 30 for delivery to the main air-fuel passage 32, the scavenging air normally being at about atmospheric pressure and preferably filtered as by pre-passage through the air filter 11 for subsequent delivery through line 20 to the inlet 47.

The end portion 50 of piston 42 opposite the inlet 51 of passage 30 from bore 37 has a reduced peripheral diameter to provide clearance 52 for any foreign matter such as dust to collect, preventing sticking or jamming of the piston in the bore.

A second valving or pilot piston 53 is urged axially in the bore 38 against partition 39 by a spring 54, opposite ends of which are received in the reduced size piston bore 55 and against the housing end cap 41, suction being communicated from line 56 to the chamber 58 at the spring side of the piston through cap 41. The opposite end of line 56 opens at port 157 into the air-fuel passage 32 in the carburetor just above the throttle gate to be uncovered when the gate is rotated clockwise from closed position as seen in Fig. 2. Port 157 may conveniently comprise the carburetor vacuum spark advance port, with line 56 being connected into the vacuum spark advance line 150 by the T-connection shown at 151 in Figs. 4 through 6.

Spring 54 is calibrated to permit retraction of the pilot piston 53 away from partition 39 whenever suction is communicated to the piston through line 56 upon opening of the throttle to uncover port 157 during engine acceleration and cruising conditions. Likewise, the spring displaces the piston back toward the partition whenever suction communication to the pilot piston is interrupted by closing of the throttle, during engine idling and deceleration conditions. The suction or degree of vacuum at port 157 and hence in line 56 is created primarily by the velocity of air passing downward between the port and the throttle plate, so that this suction does not change noticeably at any altitude.

Upon movement of pilot piston 53 toward and away from the partition under the above described circumstances, an annular peripheral groove 57 in the pilot piston momentarily registers simultaneously with ports 34 and 59 on opposite sides of the housing, to pass manifold suction existent in the air-fuel passage 32 downstream of the throttle and in line 31 to the chamber 60 at the spring side of the closed main valving piston 42, via port 59, passage 61 bridging the partition and port 62 opening into chamber 60.

Figure 5:
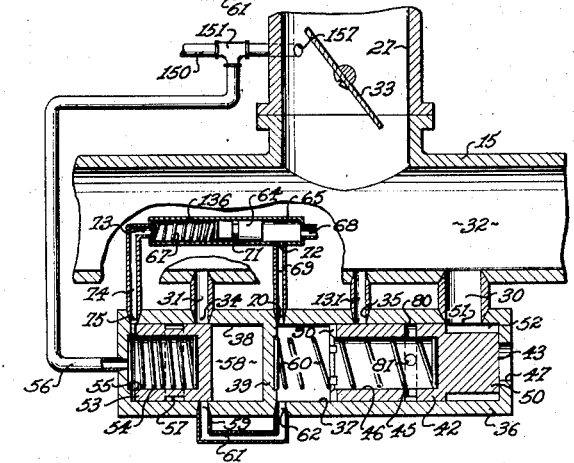
Fig. 5 shows the control device elements during engine cruising conditions.
Figure 6:
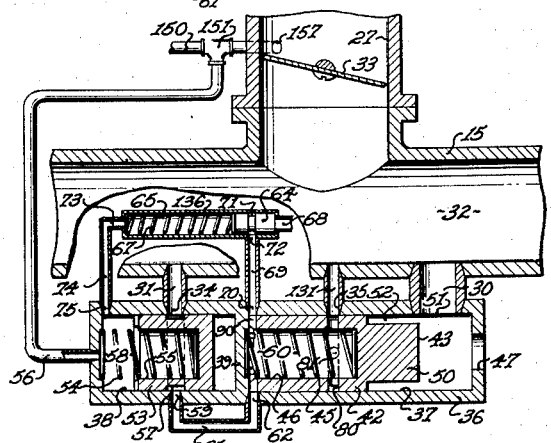
Fig. 6 illustrates the elements of the control device during engine deceleration.

A third or auxiliary valving piston 64 is shown in broken lines in Fig. 2 and schematically in full in Figs. 4 through 6, wherein the elements corresponding to those described above bear the same numbers. This piston is schematically shown as mounted for axial sliding in a bore 65 of a separate housing 136, but which actually is part of housing 36, the piston being urged by spring 67 against the atmospheric pressure air inlet 68 at the end of the bore. When the piston is in this position it prevents passage of atmospheric pressure through duct 69, and bleed port 70 to main piston chamber 60, an annular peripheral groove 71 in the auxiliary piston communicating with the port 72 opening from duct 69 into bore 65 so that pressure in that duct is symmetrically axially applied to the piston preventing sticking thereof in that bore.

Spring 67 is calibrated to permit retraction of the piston away from inlet 68 whenever suction in line 56 and chamber 58 sufficient to retract the pilot piston is communicated to chamber 73 at the spring side of the auxiliary piston through duct 74, which opens into the capped end of chamber 58 at port 75. However, the springs 67 and 54 acting on the auxiliary and pilot pistons respectively are so arranged that the former piston always retracts earlier than the latter to permit communication of atmospheric pressure to the chamber 60 before communication of manifold suction thereto through 31 and 61, upon engine acceleration. Also, the auxiliary piston tends to move forwardly to closed position faster than the pilot piston since port 68 readily exhausts air in bore 65, ahead of piston 64, whereas air trapped between piston 53 and partition 39 must pass around piston 53 as it closes in order to escape. Thus, in decelerating the engine, the supply of atmospheric air pressure to chamber 60 is cut off before peripheral groove 57 in pilot piston 53 registers with ports 34 and 59, communicating manifold pressure to chamber 60.

As shown in Figs. 3 through 6, the main scavenger piston 42 has a peripheral annular groove 80 communicating with the piston bore 46 and chamber 60 through radial holes 81. When the piston is fully retracted by manifold suction to seat against the partition 39 as shown in Fig. 6, the groove 80 registers with port 35 in the housing to pass manifold suction from line 131 to bore 46 and chamber 60, sufficient suction acting to hold the main piston in retracted position. Upon opening of the throttle 33, piston 64 retracts to permit atmospheric pressure to enter chamber 60, thereby allowing the main piston to move forward to interrupt scavenging. Alternatively, when the manifold suction in chamber 60 drops on deceleration to a predetemined value, preferably around 10 inches of mercury, spring 45 predominates to close the main valving piston.

Operation of the device will now be described, with reference to Figs. 4 through 6 of the drawings. When the engine is cold and first started, the carburetor throttle 33 will be held slightly open by the automatic choke or hand choke, as is common practice, so that the engine operates at a fast idle. At this engine speed, suction across port 157 and communicated to chamber 58 through line 56, will be sufficient to retract the pilot and auxiliary pistons 53 and 64 respectively. Since the latter retracts more quickly than the former, atmospheric air pressure will be communicated to chamber 60 behind the main piston preventing its retraction. When the engine speed drop to normal idle speed, the throttle gate 33 will close causing suction across port 157 to drop substantially zero, so that both pistons 53 and 64 will be moved rightwardly by their respective springs, these pistons then being in the position shown in Fig. 4 corresponding to normal engine idling.

As seen in Figs. 2 and 4 through 6, the port 157 is located slightly above the plane of the throttle gate in closed or idling position, and opening into the cylindrical passage 32 generally at substantially the same level as the upper one of the two typical idle jets 90 and 91, but displaced circumferentially therefrom at considerably less than 90°. Further, the port 157 is so located that when the throttle gate is wide open, the suction at the port will be almost zero so that both pistons 53 and 64 will be in their unretracted positions. However, when the throttle gate moves back toward the port 157 as during engine cruising conditions, the suction developed across the port by increased air velocity will be sufficient to retract the pistons to the positions shown in Fig. 5.

As stated above, the auxiliary piston 64 retracts faster than the pilot piston 53 so that while manifold suction is communicated to chamber 60 behind the main piston during registration of pilot piston groove 57 with portions 34 and 59, the pressure actually applied to the main piston is atmospheric pressure communicated through port 68 and duct 69. Thus, no scavenging air is admitted to the manifold during engine cruising conditions arrived at either by dropping from wide open throttle to partly open throttle or by opening the throttle from idle position to partially opened or wide opened position as during acceleration.

During deceleration the throttle gate moves to closed position as shown in Fig. 6 so that the suction across port 157 drops to zero and the auxiliary and pilot pistons therefore move rightwardly toward closed position. As the auxiliary piston moves faster than the pilot piston, the atmospheric air pressure supply to chamber 60 is cut off first, and then when the pilot piston groove 57 momentarily comes into registry with ports 34 and 59 manifold suction is communicated to chamber 60, causing the main piston 42 to retract to the position shown in Fig. 6. At this point, the main piston groove 80 registers with port 35 so that manifold suction is directly communicated to the piston bore 46 for holding the piston in retracted position after the pilot piston groove has moved out of registry with ports 34 and 59. Thus, the main or scavenging piston will remain in retracted position, permitting scavenging air to enter the manifold through duct 30, until manifold suction drops to a predetermined level at or around ten inches of mercury, at which point the spring 45 will advance the main piston to closed position. The invention contemplates sizing of the main valving piston and spring components so that the main piston will be held open in retracted position until the manifold suction drops below the value of manifold suction during engine idling; i. e., around eighteen or nineteen inches of mercury, as explained in the introduction.

If during deceleration the throttle gate is partly opened to the position shown in Fig. 5, the auxiliary piston 64 is retracted immediately, allowing atmospheric pressure communication through duct 69 and opening 90 in the main piston skirt to the bore 46 thereof and chamber 60, thereby destroying the vacuum therein and allowing the main piston to quickly move forward closing off scavenging air passage to the manifold. Wide opening of the throttle gate during deceleration will drop the suction in the manifold to below ten inches of mercury, permitting the main piston spring 45 to take over and close the piston shutting off scavenging air supply.

It will be noted that the pilot and auxiliary pistons will operate at any altitude since the suction developed across port 157 does not change appreciably with altitude. Therefore, the main or scavenging piston 42 will still move forward to closed positions at around ten inches of mercury suction communicated thereto, and the engine will still come to normal altitude idle. Less volume and weight of scavenging air is taken in at high altitudes, thus changing more gradually the drop in manifold vacuum. It is also observed that the idle fuel jets are kept active during engine deceleration with scavenging air being admitted to the manifold, although at times they will deliver a little less fuel than at idle suction conditions. Therefore, scavenging of the manifold to drop the vacuum therein to around ten inches of mercury will not cause stalling of the engine.

It will be apparent from the above detailed description of a preferred form of our invention, that it will fulfill all the objects of our invention, as previously expressed. While we have described the same in detail, our invention is subject to various changes and embodiments without departing from the principles thereof, and we accordingly do not desire to be limited in our protection to such details of construction as above described, except as may be necessitated by the prior art and the appended claims.

We claim:

1. The combination, comprising an internal combustion engine air-fuel intake and exhaust outlet system including a carburetor and intake manifold for delivering an air-fuel mixture to the engine and means within which combustible fluid exhausted from the engine is oxidized, means connected into said system for flowing scavenging air to said manifold during engine deceleration entraining combustible fluid therein and transporting the fluid to said first means for oxidation, main valve means to control said flow and movable to pass said flow upon application thereto of manifold suction, and other valve means in communication with the main valve and movable to control application of said manifold suction to the main valve in response to communication to said other valve means during engine deceleration of suction other than from the manifold, whereby the main valve is operable to pass said scavenging air to the manifold during engine deceleration.

2. The invention as defined in claim 1, including an intake air filter for delivering clean air to the carburetor and manifold, and a duct connected with said filter for receiving clean air and in clean air delivering relation with said main valve.

3. The combination, comprising an internal combustion engine air-fuel intake and exhaust outlet system including a carburetor and intake manifold for delivering an air-fuel mixture to the engine and an after burner for burning any combustible fluid exhausted from the engine, means connected into said system for flowing scavenging air to said manifold during engine deceleration entraining combustible fluid therein and transporting the fluid to said after burner for combustion, main valve means to control said flow and movable to pass the flow upon temporary application thereto of manifold suction in excess of a predetermined amount that is less than manifold suction at engine idling, said main valve means including a spring operable to close said main valve upon application thereto of manifold suction reduced to less than said predetermined amount, other valve means in communication with the main valve and movable to control temporary application of said manifold suction to the main valve in response to communication to said other valve means during engine deceleration of suction other than from the manifold, and a duct communicating with the main valve to pass manifold suction thereto following said temporary application of manifold suction thereto for holding said main valve in flow-passing open condition, whereby the main valve is operable to pass said scavenging air to the manifold during engine deceleration.

4. An improved engine manifold air scavenging control, comprising means connectible into the air inlet system of an internal combustion engine downstream of the engine carburetor for flowing scavenging air into the engine manifold, main valve means to control said flow and movable to pass the flow upon temporary application thereto of manifold suction in excess of a predetermined amount that is less than manifold suction at engine idling, said main valve means including a spring operable to close said main valve upon application thereto of manifold suction reduced to less than said predetermined amount, other valve means in communication with the main valve and movable to control temporary application of said manifold suction to the main valve in response to communication to said other valve means during engine deceleration of suction other than from the manifold, said other valve means including a second valve movable in opposite directions to pass manifold suction to the main valve in response to increased and decreased suction communication thereto during engine acceleration and deceleration respectively, said other valve means including a third valve movable to pass atmospheric air pressure to the main valve during passage by the second valve of manifold suction to the main valve in response to increased suction communication to the second valve, and a duct communicating with the main valve to pass manifold suction thereto following said temporary application of manifold suction thereto for holding said main valve in flow passing open condition, whereby the main valve is operable to pass said scavenging air to the manifold only during engine deceleration.

5. The invention as defined in claim 4 in which said third valve is movable in response to communication of said increased and decreased suction thereto.

6. For combination with an engine intake manifold, an improved engine manifold air scavenging control, comprising main valve means to control flow of said scavenging air to the manifold and movable to pass said flow upon application thereto of manifold suction, a duct through which said manifold suction is applicable to said main valve, and other valve means movable to control application of said manifold suction through said duct to the main valve in response to communication to said other valve means during engine deceleration of suction other than from the manifold, said other valve means including a piston operable to block said duct after endwise piston movement and said piston having opposite ends remaining out of communication with said duct and a passage at the piston side registrable with said duct only during said piston endwise movement whereby the main valve is operable to pass said scavenging air to the manifold during engine deceleration.

7. For combination with an engine intake manifold, an improved engine manifold air scavenging control, comprising main valve means to control flow of said scavenging air to the manifold and movable to pass said flow upon application thereto of manifold suction in excess of a predetermined value that is less than manifold suction at engine idling, said means including yielding means operable to close said main valve upon application thereto of manifold suction reduced to less than said predetermined amount, a duct through which said manifold suction is applicable to said main valve, and other valve means movable to control application of said manifold suction through said duct to the main valve in response to communication to said other valve means during engine deceleration of suction other than from the manifold, said other valve means including a piston operable to block said duct after endwise piston movement and said piston having opposite ends remaining out of communication with said duct and a passage at the piston side registrable with said duct only during said piston endwise movement whereby the main valve is operable to pass said scavenging air to the manifold during engine deceleration.

8. For combination with an engine intake manifold, an improved engine manifold air scavenging control, comprising main valve means to control flow of said scavenging air to the manifold in amount sufficient to drop manifold suction at any engine speed during deceleration to values no greater than suction at idling and movable to pass said flow upon temporary application thereto of manifold suction in excess of a predetermined amount that is less than manifold suction at engine idling, a duct through which said manifold suction is applicable to said main valve, other valve means movable to control temporary application of said manifold suction through said duct to the main valve in response to communication to said other valve means during engine deceleration of suction other than from the manifold, said other valve means including a piston operable to block said duct after endwise piston movement and said piston having opposite ends remaining out of communication with said duct and a passage at the piston side registrable with said duct only during said piston endwise movement, and other duct means communicable with the main valve to pass manifold suction thereto following said temporary application of manifold suction thereto, whereby the main valve is operable to pass said scavenging air to the manifold during engine deceleration.

9. For combination with an engine intake manifold, an improved engine manifold air scavenging control, comprising means connectible into the air inlet system of an internal combustion system downstream of the engine carburetor for flowing scavenging air into the engine manifold, main valve means to control said flow and movable to pass the flow upon temporary application thereto of manifold suction in excess of a predetermined amount that is less than manifold suction at engine idling, said main valve means including a spring operable to close said main valve upon application thereto of manifold suction reduced to less than said predetermined amount, a duct through which said manifold suction is applicable to said main valve, other valve means movable to control temporary application of said manifold suction through said duct to the main valve in response to communication to said other valve means during engine deceleration of suction other than from the manifold, said other valve means including a piston operable to block said duct after endwise piston movement and said piston having opposite ends remaining out of communication with said duct and a passage at the piston side registrable with said duct only during said piston endwise movement, and another duct communicable with the main valve to pass manifold suction thereto following said temporary application of manifold suction thereto for holding said main valve in flow passing open condition, whereby the main valve is operable to pass said scavenging air to the manifold during engine deceleration.

10. The invention as defined in claim 9 in which said piston is movable in opposite directions to pass manifold suction to the main valve during piston movement in either direction.

11. The invention as defined in claim 10 in which said piston is movable in said opposite directions in response to increased and decreased suction communication thereto during engine acceleration and deceleration respectively.

12. The invention as defined in claim 11 including a spring operable to move said piston in one direction during decreased suction communication thereto.

13. For combination with an internal combustion engine intake manifold and carburetor throttle valve, means insertible between the throttle valve and manifold inlet forming a through opening for passing the air to the manifold, said means containing a passage communicating with said opening for flowing manifold scavenging air thereto, main valve means to control flow of said scavenging air to said passage and movable to pass said flow upon application thereof of manifold suction in excess of a predetermined value that is less than manifold suction at engine idling, a duct through which said manifold suction is applicable to said main valve, and other valve means movable to control application of said manifold suction through said duct to the main valve in response to communication to said other valve means during engine deceleration of suction other than from the manifold, said other valve means including a piston operable to block said duct after endwise piston movement and said piston having opposite ends remaining out of communication with said duct and a passage at the piston side registrable with said duct only during said piston endwise movement, whereby the main valve is operable to pass said scavenging air to the manifold during engine deceleration.

14. For combination with an internal combustion engine intake manifold and carburetor, a pair of superposed flanges insertible between and connectible with the carburetor outlet flange and manifold inlet flange and forming a through opening registrable with said inlet and outlet for passing the carbureted air-fuel mixture to the manifold, at least one of said flanges containing a passage communicating with said opening for flowing manifold scavenging air thereto, main valve means to control said flow of said scavenging air to said passage and movable to pass said flow upon application thereto of manifold suction in excess of a predetermined value that is less than manifold suction at engine idling, a duct through which said manifold suction is applicable to said main valve, and other valve means movable to control application of said manifold suction through said duct to the main valve in response to communication to said other valve means during engine deceleration of suction other than from the manifold, said other valve means including a piston operable to block said duct after endwise piston movement and said piston having opposite ends remaining out of communication with said duct and a passage at the piston side registrable with said duct only during said piston endwise movement whereby the main valve is operable to pass said scavenging air to the manifold during engine deceleration.

15. The invention as defined in claim 14, including a housing containing said main and other valve means, and interconnected flanges respectively integral with said housing and superposed flanges.

16. The combination, comprising an internal combustion engine air-fuel intake system including a carburetor having a throttle valve and an intake manifold for delivering an air-fuel mixture to the engine, means connected into said system for flowing scavenging air to said manifold, main valve means to control said flow and movable to pass said flow upon application thereto of manifold suction in excess of a predetermined minimum value that is less than manifold suction at idling, a duct through which said manifold suction is applicable to said main valve, and other valve means movable to control application of said manifold suction through said duct to the main valve in response to communication to said other valve means of suction taken from the main air-fuel passage in the carburetor, said other valve means including a piston operable to block said duct after endwise piston movement and said piston having opposite ends remaining out of communication with said duct and a passage at the piston side registrable with said duct only during said piston endwise movement and ducting communicating between said other valve means and said carburetor main air-fuel passage.

17. The invention as defined in claim 16 in which the duct opening to said main passage is positioned to be traversed by said throttle valve upon opening thereof from idle position in said main passage.

18. For combination with an engine intake manifold, an improved engine manifold air scavenging control, comprising main valve means to control flow of said scavenging air to the manifold and movable to pass said flow upon application thereto of manifold suction, duct means through which said manifold suction is applicable to said main valve, and other valve means including a second valve movable in opposite direction to control application of manifold suction through said duct to the main valve in response to communication to said second valve of increased and decreased suction other than from the manifold during engine acceleration and deceleration respectively, said other valve means including a third valve movable to vent manifold suction otherwise applicable to the main valve in response to communication of said increased suction to said third valve, whereby the main valve is operable to pass said scavenging air to the manifold only during engine deceleration.

19. The invention as defined in claim 18 including other duct means communicating with the main valve to pass manifold suction thereto following main valve movement to pass said scavening air flow for holding said main valve in flow passing open condition.

20. The combination, comprising an internal combustion engine air and fuel intake and exhaust outlet system including an air intake manifold, means for delivering hydrocarbon fuel to air supplied to the engine through said manifold, a throttle valve for regulating said air supply, afterburner means through which engine exhaust is flowable and within which uncombusted exhausted hydrocarbons are combusted to heat said afterburner means, and auxiliary valve means connected into said air intake system for controlling flow to said manifold of a side stream of air at substantially atmospheric pressure and movable to pass said air stream thereto during engine deceleration and in response to system suction applied to said auxiliary valve means, whereby flow of said air stream into said engine during deceleration is operable to prevent vacuum suction of engine lubricant hydrocarbons into said engine exhaust thereby preventing overheating of said afterburner means.

References Cited in the file of this patent

UNITED STATES PATENTS

| | | |
|---|---|---|
| 1,605,484 | Thompson et al. | Nov. 2, 1926 |
| 2,269,496 | Vanderpoel et al. | Jan. 13, 1942 |
| 2,439,573 | Mallory | Apr. 13, 1948 |
| 2,466,090 | Fageol | Apr. 5, 1949 |